Jan. 18, 1966  R. J. MATEJ  3,229,586

MACHINE AND METHOD OF MAKING FORM-ROLLING DIE

Filed May 21, 1963  2 Sheets-Sheet 1

INVENTOR.
RONALD J. MATEJ
BY
ATTORNEY

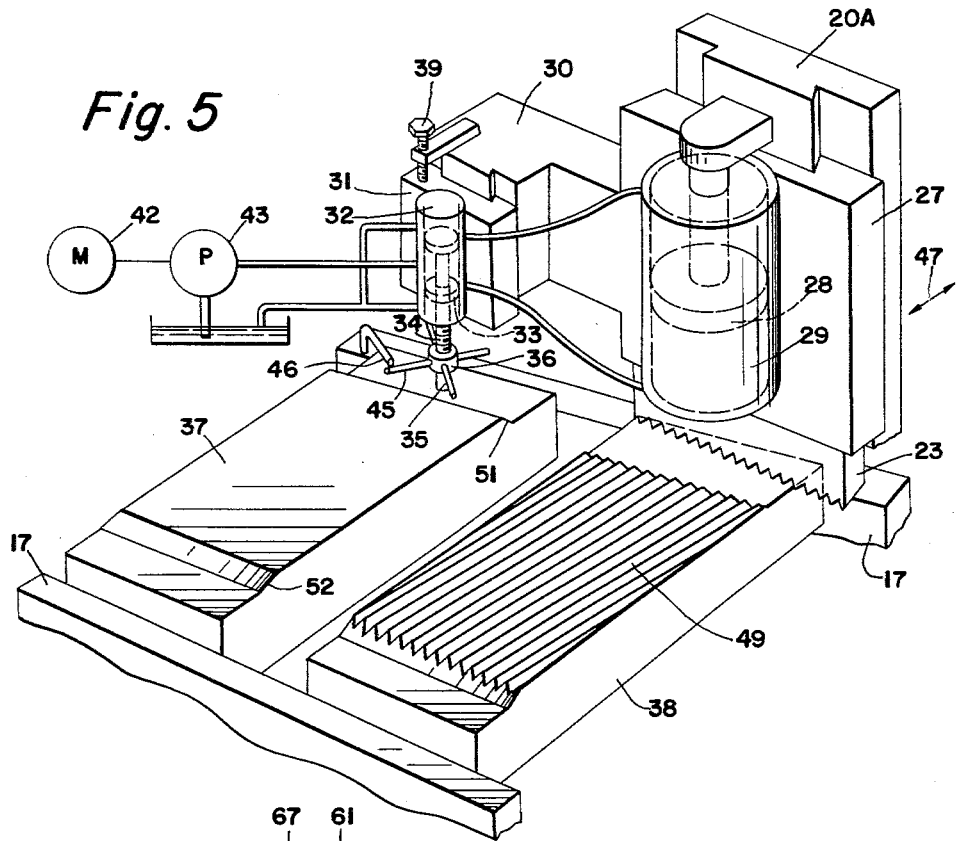
Fig. 5
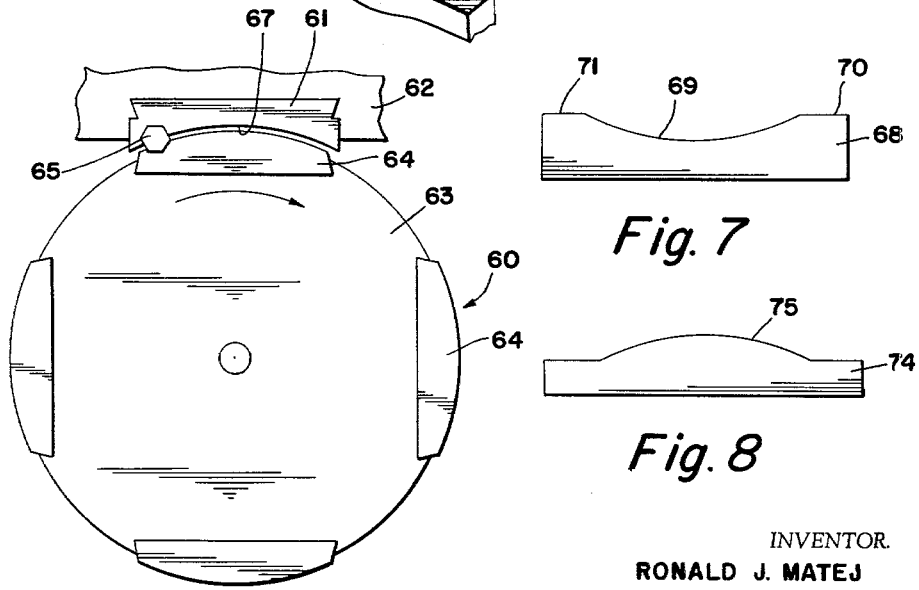
Fig. 6
Fig. 7
Fig. 8
INVENTOR.
RONALD J. MATEJ
BY
ATTORNEY United States Patent Office  3,229,586
Patented Jan. 18, 1966

3,229,586
MACHINE AND METHOD OF MAKING
FORM-ROLLING DIE
Ronald J. Matej, Parma, Ohio, assignor to Prutton
Corporation, Cleveland, Ohio
Filed May 21, 1963, Ser. No. 281,978
6 Claims. (Cl. 90—24.3)

The invention relates in general to a machine and method for making form-rolling dies such as thread-rolling dies and, more particularly, to a simplified and more rapid manner of making such dies by using, generally, a shaper-type mechanism.

Form-rolling dies, such as thread-rolling dies, are now customarily used for forming threads on cylindrical surfaces such as bolts and machine screws by rolling the thread form into the workpiece as the two dies are relatively reciprocated with the workpiece therebetween. One pass of the dies is sufficient to completely form the thread and the workpiece to the proper depth and the dies are made sufficiently long with a sufficient number of starts on the dies to accomplish this purpose. However, such thread-rolling dies, whether of the flat variety or the curved planetary type, have customarily been made either by grinding the thread form into the die or by use of a special type milling cutter. In grinding of the thread form into the die, it is necessary to first make a tool to shape a cylindrical grinding wheel. This would be a toothed tool. Next, the grinding wheel is shaped with a toothed outline from this tool so that the grinding wheel has this ridged periphery. Then a special machine tool is used where the die is reciprocated past the rotating grinding wheel so that the ridged grinding wheel grinds the thread form into the die. It is usually necessary to dress or reshape the grinding wheel with the tool one or more times during the making of the thread forming die. In the milling process of making the thread die a similarly complex process must be followed. First, the milling cutter must be cut on a special milling hobber and then the milling cutter may be used to mill the plurality of grooves in the thread forming die. As the milling cutter wears it must be resharpened and, of course, its position relative to the die must be reset to compensate for its smaller diameter after being resharpened. Both of these methods are long and involved and hence expensive in time, machinery and tooling.

Accordingly, an object of the present invention is to provide a method of making a form-rolling die which obviates many of the above recited disadvantages.

Another object of the invention is to provide a machine for making a form-rolling die which machine is of the shaper-type and utilizes a shaper-type tool.

Another object of the invention is to provide a method of making a thread-rolling die which is either a flat or a curved die and utilizes a shaper-type tool.

Another object of the invention is to provide a method of making thread-rolling dies wherein a workpiece and a shaper-type tool are reciprocated along a first path to cut the workpiece and the tool and workpiece are progressively fed toward each other along a second transverse path.

Another object of the invention is to provide a method of making a curved form-rolling die in which a workpiece and a shaper-type tool are relatively moved along a first straight path and are also relatively moved along a second straight path in synchronism so as to form a curved plurality of grooves on the workpiece.

Other objects and a fuller understanding of this invention may be had by referring to the following description and claims, taken in conjunction with the accompanying drawings, in which:

FIGURE 5 is an isometric partial view of a modified form of shaper-type mechanism to form flat or curved dies;

FIGURE 6 is a plan view of a planetary thread-rolling mechanism showing the rotary and stationary dies;

FIGURE 7 is a plan view of the master used to form the stationary planetary die; and FIGURE 8 is a plan view of the master used to form the planetary rotary die.

Figure 1:
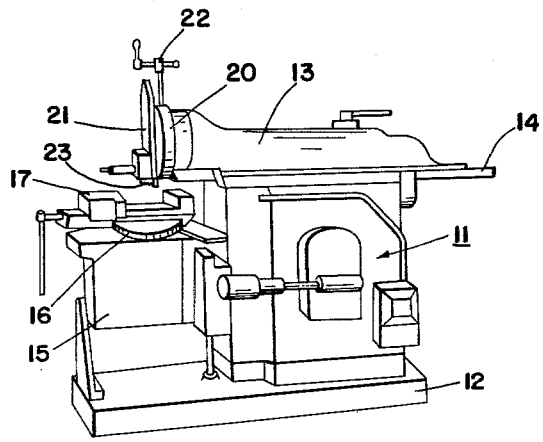
FIGURE 1 is a perspective view of a shaper-type machine which may be used in the practice of the invention.

FIGURE 1 illustrates one form of machine which may be used to form thread-rolling dies in accordance with the invention. Thread-rolling dies are used as an example of many types of form-rolling dies such as knurling dies, embossing dies and the like. The machine shown in FIGURE 1 is a shaper 11 which has a base 12 and a ram 13 reciprocable on ways 14 along a first path. The typical shaper has a ram which moves horizontally along a straight line path and this type of machine is satisfactory to practice the invention. A table 15 carries a circular plate 16 on which a vise 17 is carried. The plate 16 permits the vise 17 to be swiveled about a vertical axis. The vise jaws 17 may clamp a workpiece 18. The ram 13 carries a swiveling head 20 which may be swiveled about a horizontal axis and this carries a slide 21 which may be moved transversely of the ram movement by a screw 22. The slide 21 carries a shaper-type tool 23 for operation on the workpiece 18. Suitable power mechanism, not shown, is provided as is conventional for reciprocating the ram 13. Also, the typical shaper has a progressive feed mechanism to progressively downwardly feed the tool 23 at the end of each two stroke cycle.

Figure 2:
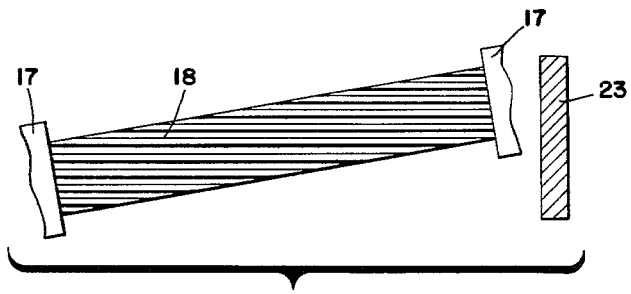
FIGURES 2, 3 and 4 are plan, end and side views, respectively, of the workpiece and tool.
Figure 3:
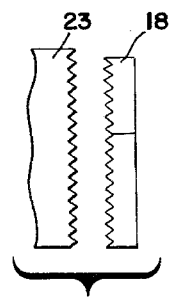
Figure 4:
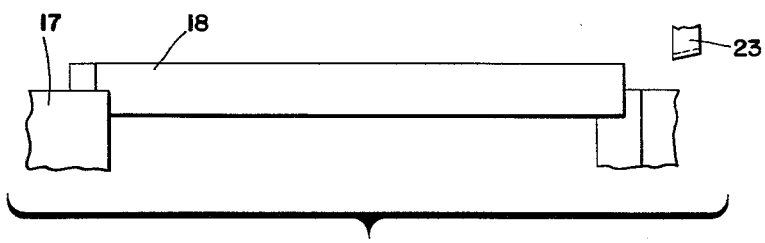

FIGURES 2, 3 and 4 show plan, end and side views of the vise 17 carrying the workpiece 18. The workpiece 18 has been shown with the grooves already formed therein but, of course, upon starting the workpiece would have a smooth upper face. The vise 17 is swiveled on the plate 16 so that the workpiece 18 is positioned on the table 15 at an angle relative to the first path of movement of the ram 13 corresponding to the pitch angle desired on the workpiece. A typical workpiece which is a thread-rolling die will have a width greater than the length of the cylindrical blank which is to become a bolt or machine screw and will have many starts of threads on the die. There may be as many as 40 to 50 starts for even a single pitch thread. FIGURE 2 shows such a workpiece with a plurality of starts. The shaper 11 is turned on and the ram 13 reciprocates so that the shaper-type tool 23 cuts a plurality of shallow grooves in the upper face of the workpiece 18. This upper face of the workpiece 18 is in a plane parallel to the path of movement of the ram 13. After the first cycle, the slide 21 automatically moves downwardly toward the workpiece 18 a predetermined amount and then another cut is taken. This progressive feed and succession of cutting strokes continues until the tool 23 has cut the workpiece 18 to produce the finished thread therein. In one embodiment of the invention actually constructed, the shaper was set to reciprocate at 40 strokes per minute. It was cutting a ¼ x 20 die, namely, a die used to form 20 pitch thread on a ¼ inch diameter bolt. The transverse feed of the slide 21 was set at .001 inch per cut. The finished thread depth for this die is .030 inch and, accordingly, the entire die was completed in 30 cutting strokes or 45 seconds. This is contrasted with about 6 minutes to complete a similar die by milling or grinding and with use of more complicated machinery and more complex and costly tooling.

The tool need not be fed vertically, it may be fed at an angle to the vertical. For example, it may be fed as in thread chasing wherein the path of movement is parallel to one of the V sides of the thread. In either case, the feed movement of the tool will be transverse to the cutting stroke movement of the ram 13.

FIGURE 5 is an isometric partial view showing a swiveling head 20A which may replace the head 20 in FIGURE 1. This head 20A carries a transversely movable slide 27. A piston 28 is fixed to the head 20A and is disposed inside a cylinder 29 fixed to the slide 27. The shaper-type tool 23 is carried on the slide 27.

An arm 30 is an extension on one side of the slide 27 and carries an adjusting slide 31 which is adjustable parallel to the slide 27. This slide 31 carries a tracer valve cylinder 32 in which a tracer valve spool 33 is reciprocable parallel to the slide 27. This valve spool 33 is threaded at 34 and a tracer tip 35 cooperates with a master 37 which is clamped in the vise jaws 17 beside the workpiece 38.

The adjusting slide 31 may be adjusted by an adjusting screw 39. A motor 42 drives a pump 43 as a hydraulic fluid pressure source to supply fluid under pressure to the tracer valve 32. The nut 36 is a capstan nut having spokes 45 thereon for successive actuation by a stationary abutment 46.

The head 20A is reciprocated by the ram 13 along a first path indicated by the arrow 47. The thread forming grooves 49 formed in the workpiece 38 will be parallel to this path 47. The master 37 has a lead on portion 51 and leave off portion 52. Thus, as the grooves 49 are progressively cut deeper and deeper into the workpiece 38 as the ram reciprocates, the workpiece 38 will be provided with a corresponding lead on and leave off. This will permit two complementary thread-rolling dies to more properly operate on a cylindrical bolt blank to form threads thereon. As the ram reciprocates through its two stroke cycle, the tool 23 is progressively fed downwardly. This is accomplished in FIGURE 5 by the abutment 46 which progressively turns the capstan nut 36, raising the tracer tip 35. Accordingly, the tracer valve 32 supplies fluid to the cylinder 29 to lower the slide 27 and the tracer valve cylinder 32 to restore equilibrium. The adjusting screw 39 may be used to provide the initial starting of the tool 23 relative to the workpiece 38.

FIGURE 6 illustrates the use of a planetary thread-rolling machine 60 in which a stationary die 61 is mounted on a base 62. A rotary table 63 carries a plurality of rotary dies 64 each of which successively cooperate with the stationary die 61 to roll threads or other forms on a cylindrical workpiece blank 65. This is shown in the drawing as a headed bolt. The concave thread-forming surface 67 of the stationary die 61 may be formed on the apparatus of FIGURE 5. This stationary die would be clamped in the vise jaws 17 in place of the workpiece 38. The FIGURE 7 shows a master 68 with a concave control surface 69 and flat lead on and leave off surfaces 70 and 71, respectively. Similarly, FIGURE 8 shows a master 74 which has a convex control surface 75 which may be used to form the working surfaces of the rotary dies 64 on the machine of FIGURE 5.

It will be noted that in FIGURE 5 a curved surface will be formed on the stationary die 61 or rotary die 64 by the synchronized movements in first and second paths. The first path is a straight line path 47 and the second path is also a straight line path of the slide 27 and tool 23 and with these two movements synchronized to provide a curved path on the workpiece.

The shaper-type tool 23 is preferably wider than the effective width of the workpiece 18, see FIGURE 2, considering the fact that a plurality of starts are to be formed on this workpiece 18. A narrower tool may be used by making a first series of cuts to progressively greater depths as described above and then making another series of cuts to one side to finish the wider workpiece.

A planer is a type of machine which utilizes a shaper-type tool and wherein the workpiece moves under the relatively stationary tool for each cut. This type of machine may also be used to practice this invention.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:
1. The method of making a form-rolling die by use of a work-holding table and a toolholder relatively movable along a first path and along a second path transverse to said first path by tracer controlled means, said method comprising the steps of selecting a shaper-type cutting tool having cutting teeth thereon of the form desired for the finished form-rolling die, mounting said cutting tool in said toolholder, relatively reciprocating said tool and a workpiece blank along said first path to cut a series of parallel grooves in one face of said workpiece blank of a predetermined depth, and progressively relatively feeding said shaper tool and said blank toward each other along said second path under control of said tracer controlled means to a point where a complete form is cut into said workpiece blank.

2. The method of making a thread-rolling die having a lead on and a lead off by use of a work-holding table and a toolholder relatively movable on a first path and with said toolholder and table relatively movable in a second path transverse to said path by tracer controller means, said method comprising the steps of selecting a shaper-type cutting tool having cutting teeth thereon of the form desired for the finished thread-rolling die, mounting said cutting tool in said toolholder, mounting a workpiece blank on said table at an angle relative to said first path of relative movement corresponding to the pitch angle desired on said workpiece, relatively reciprocating said tool and said workpiece blank in said first path and synchronously relatively controlling movement of said table and toolholder in said second path under control of said tracer controlled means to cut a series of parallel grooves with a lead on and a lead off in one face of said workpiece blank of a predetermined depth.

3. The method of making a curved planetary thread-rolling die by use of a work-holding table and a toolholder relatively movable along a path, said method comprising the steps of selecting a shaper-type cutting tool having cutting teeth thereon of the form desired for the finished thread-rolling die, mounting said cutting tool in said toolholder, mounting a workpiece blank on said table at an angle relative to said path of relative movement corresponding to the pitch angle desired on said workpiece, relatively reciprocating said workpiece and tool along said path to cut a series of parallel grooves in one face of said workpiece blank of a predetermined depth, said tool having a transverse width at least equal to the width of said workpiece blank at said pitch angle, tracer controlled means, moving said shaper tool transversely of said path and relative to the workpiece blank during cutting strokes under control of said tracer controlled means to cut a curved surface in said workpiece blank, and progressively feeding said shaper tool transversely of said path into the workpiece between cutting strokes to a point where a complete thread form is cut into said workpiece blank.

4. The method of making a curved planetary thread-rolling die by use of a work-holding table movable in a straight path and a toolholder movable transversely to said path by tracer controlled means, said method comprising the steps of selecting a shaper-type cutting tool having cutting teeth thereon of the form desired for the finished thread-rolling die, mounting said cutting tool in said toolholder, mounting a workpiece blank on said table at an angle relative to said path of movement of said table corresponding to the pitch angle desired on said workpiece, reciprocating said table along said straight path and synchronously reciprocating said toolholder along said transverse path under control of said tracer controlled means to cut a series of curved parallel grooves in the upper face of said workpiece blank of a predetermined depth, said tool having a transverse width at least equal to the width of said workpiece blank at said pitch angle, and progressively feeding said shaper tool transversely into the workpiece between cutting strokes to a point where a complete thread form is cut into said workpiece blank.

5. A machine for making a form-rolling die by use of a single shaper-type cutting tool having cutting teeth thereon of the form desired for the finished thread-rolling die, said machine comprising, in combination, a base, a work-holding table on said base, a toolholder movable on said base along first and second paths, means to mount a workpiece blank on said table at an angle relative to said first path of relative movement corresponding to the pitch angle desired on said workpiece, means to mount said cutting tool in said toolholder for operation on said workpiece blank, means to reciprocate said tool along said first path, means to mount a master adjacent said workpiece, tracer controlled servomotor means controlled by said master to move said tool along said second path in synchronism with said reciprocating means, to cut a series of parallel grooves in one face of said workpiece blank of a predetermined depth, and means to relatively progressively feed said shaper tool transversely along said second path into the workpiece between cutting strokes to cut a form into said workpiece blank.

6. A machine for making a curved thread-rolling die by use of a shaper-type cutting tool having cutting teeth thereon of the form desired for the finished thread-rolling die, said machine comprising, in combination, a base, a toolholder and a work-holding table relatively movable on said base along first and second paths, means to mount a workpiece blank on said table at an angle relative to said first path of relative movement corresponding to the pitch angle desired on said workpiece, means to mount said cutting tool in said toolholder for operation on said workpiece blank, pattern and tracer controlled means, means to relatively reciprocate said tool and said workpiece blank along said first path and to simultaneously relatively move said toolholder and table along said second path under control of said pattern and tracer controlled means to cut a series of curved parallel grooves in one face of said workpiece blank of a predetermined depth.

References Cited by the Examiner

UNITED STATES PATENTS

| | | | |
|---|---|---|---|
| 602,884 | 4/1898 | Urban | 90—13 |
| 656,795 | 8/1900 | Steen et al. | 90—49 |
| 1,151,737 | 8/1915 | Thomas | 29—97 X |
| 2,278,792 | 4/1942 | Mentley | 90—24 |
| 2,346,823 | 4/1944 | Clench et al. | 90—13.5 |
| 2,537,164 | 1/1951 | Sherr | 90—24 X |
| 2,952,191 | 9/1960 | Cornelius | 90—38 |
| 3,055,274 | 9/1962 | Armytage | 90—24.3 |

WILLIAM W. DYER, Jr., *Primary Examiner.*